United States Patent
Groth

[11] 3,978,273
[45] Aug. 31, 1976

[54] HEAT-REFLECTING WINDOW PANE

[75] Inventor: Rolf Groth, Witten, Germany

[73] Assignee: Flachglas Aktiengesellschaft Delog-Detag, Germany

[22] Filed: July 1, 1974

[21] Appl. No.: 484,609

[30] Foreign Application Priority Data
July 5, 1973   Germany............................ 2334152

[52] U.S. Cl.................................... 428/434; 350/1; 350/164; 427/166
[51] Int. Cl.² ........................ G02B 1/10; B05D 5/06
[58] Field of Search ............ 117/33.3, 71 R, 124 C; 350/1, 163, 164, 165, 166; 427/165, 166; 428/434

[56] References Cited
UNITED STATES PATENTS

| | | | |
|---|---|---|---|
| 3,236,290 | 2/1966 | Leuder................................ | 350/1 X |
| 3,516,720 | 6/1970 | Mauer................................ | 350/1 X |
| 3,537,944 | 11/1970 | Grubb et al........................ | 350/1 X |
| 3,682,528 | 8/1972 | Apfel et al........................... | 350/1 |

FOREIGN PATENTS OR APPLICATIONS
2,029,181   10/1972   Germany

Primary Examiner—Michael R. Lusignan
Attorney, Agent, or Firm—Hill, Gross, Simpson, Van Santen, Steadman, Chiara & Simpson

[57] ABSTRACT

A heat reflecting window pane consisting of a laminate of a transparent support layer, an absorption layer, a silver reflecting layer and an anti-reflecting layer. A fifth layer of transparent material may also be provided.

13 Claims, 2 Drawing Figures

HEAT-REFLECTING WINDOW PANE

BACKGROUND OF THE INVENTION

1. Field of the Invention

This invention relates to window panes and more particularly to laminated coated window panes.

2. The Invention in General

This invention relates to a heat-reflecting window pane which has a transmissivity of 20–60% for visible light and which comprises a transparent support layer provided with a heat-reflecting metal film composed of silver, wherein an absorption layer consisting of a metal, metalloid or metal alloy is disposed between the metal film and the transparent support layer, such absorption layer having a thickness to provide a light transmissivity of the laminate consisting of the transparent support layer and the absorption layer which is 10–65% less then that of the transparent support layer, the refractive index and absorption coefficient of the absorption layer being of the same order of magnitude for visible light, and an anti-reflection layer of refractive dielectric material which is substantially absorption-free for visible light and has a refractive index of more than 1.7 is disposed on the other side of the metal film.

THE PRIOR ART

Window panes comprising a transparent support layer provided with a heat-reflecting metal film of gold, silver or copper are known for glazing buildings, rail vehicles and buses, and they prevent overheating of the interior by solar radiation. Window panes of this kind having a heat-reflecting metal film with a transmissivity of about 30–40% of the visible light have been satisfactorily adopted. However, a disturbing feature of such panes is their considerable reflecting effect when viewed from inside. Moreover, when viewed from outside, panes having a gold film look goldish-yellow, panes having a copper film exhibit an intensely disturbing reddish tint, whilst panes having a silver film present a strong tint of blue in transmission. Attempts have already been made to obviate these disadvantages by sandwiching the gold, silver or copper film between de-reflecting layers of a dielectric material. In this way the transmission of light can be substantially increased, approximately to 70%. When viewed from outside, the panes have a pleasant grayish-blue color and when viewed from inside they exhibit no disturbing reflection effect.

For many applications, in particular for the glazing of large offices in which work is performed in artificial lighting, it is desirable to reduce the incidence of visible light to about 20–60%, while at the same time providing insulation against solar radiation. This can be done by increasing the thickness of the gold, silver or copper film, but this is accompanied by the considerable disadvantage that the panes give an uneven color impression as seen from the outside and have a cloudy appearance when looked through.

These irregularities are evidently due to slight variations in the thickness of the layers, more particularly of the two de-reflecting layers. With this known sequence of layers, the demands made on the uniformity of the layers are so heavy that they cannot be satisfactorily met when coating the relatively large surfaces which are required in practical applications. Consequently, the rejection rate in the manufacture of such known panes would be large and the manufacture uneconomical.

To obviate these disadvantages, German Pat. No. 2,029,181 suggested a heat-reflecting pane as recited above, using a heat-reflecting metal film consisting of gold. Thereby a heat-reflecting window pane is produced which transmits about 20–60% of the visible light, but which in the same way as the known panes having a light transmission of 70%, has a pleasant relatively neutral greyish-blue tint when viewed from outside and is uniformly free from reflection when viewed from the inside.

Due to the high price of gold, however, these heat-reflecting panes are too expensive for many applications. It is therefore an object of the present invention, while maintaining the advantages and further improving the neutral color of the heat-reflecting pane according to German Pat. No. 2,029,181 when viewed from outside, to provide a heat-reflecting pane which can be manufactured substantially more cheaply than the known pane.

SUMMARY OF THE INVENTION

To overcome the problems of the prior art, according to the present invention, the heat-reflecting gold film of the pane according to said German patent is replaced by a silver film.

Surprisingly, using the sequence of layers to that of said German patent as regards the absorption layer and a dielectric anti-reflection layer, but with a silver film substituted for the gold film, it is possible to produce a heat-reflecting pane having a pleasant neutral greyish-blue appearance when viewed from outside, a uniform appearance of low reflection when viewed from inside, and substantially the same light transmission and solar radiation insulating properties, the neutrality of color when the pane is viewed from the outside being further improved by the suppression of the slight bluish tone. the substantial elimination of the slight bluish tone from the pane of said German Patent enables the pane according to the present invention to be combined in a more versatile manner with facade elements of different colors. Particularly satisfactory results have been obtained with panes using a silver layer producing a neutral gray color.

This is a surprising result, since the optical properties of the infra-red-reflecting metals gold and silver differ substantially from one another, more particularly in the visible zone of the spectrum. It was therefore not evident that the substitution of silver for gold produces a heat-reflecting film having very similar properties, more particularly since the resulting properties are produced by a very complicated interaction of the three component layers, namely the absorption layer, the heat-reflecting metal film and the anti-reflecting layer, and not by a simple additive effect of their properties. According to a preferred feature of the present invention, the absorption layer has a thickness to provide a light transmissivity of the laminate consisting of the transparent support layer and the absorption layer which is 15–60% less than that of the transparent support layer.

Preferably, the refractive index and the absorption coefficient of the absorption layer are equal for visible light.

Advantageously, the absorption layer comprises one of the elements of the fourth period of the periodic table of elements having the atomic numbers 20 to 28 inclusive, or an alloy of such elements with one another or with other elements.

If desired, the anti-reflection layer may be covered by a transparent protective layer or be joined by an intermediate adhesive layer to a glass cover sheet.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
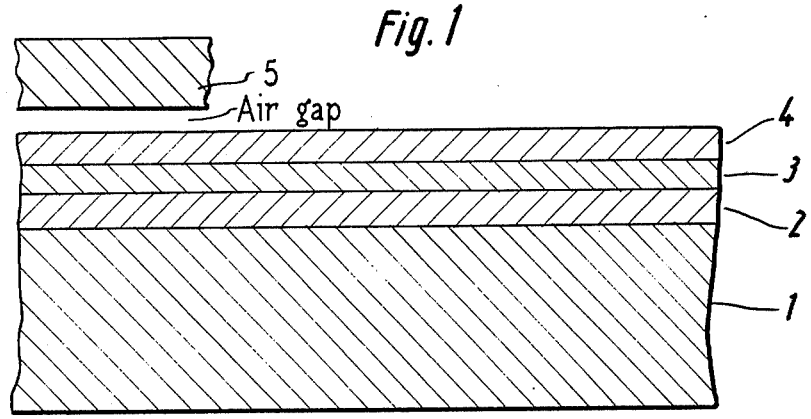
FIG. 1 is a diagrammatic cross-sectional view of a heat-reflecting window pane embodying the present invention.
Figure 2:
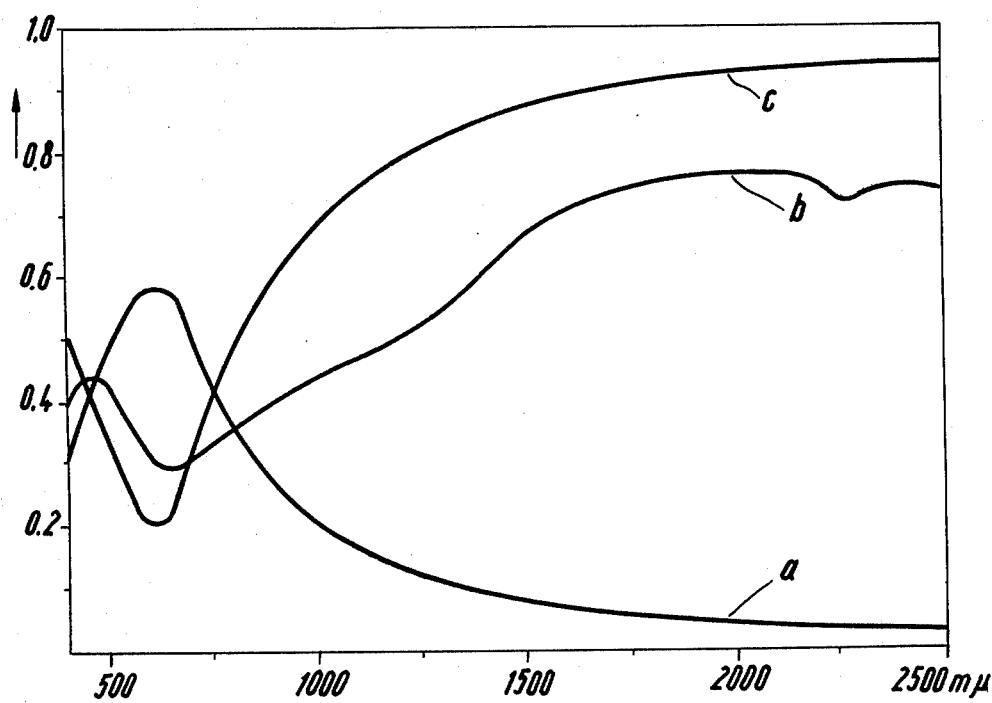
FIG. 2 shows the spectral transmissivity and reflection curves of a heat-reflecting window pane embodying the invention and having a silver film for the wavelength range of 400–2500 nm.

Referring to FIG. 1, a transparent support layer 1, for instance, a sheet of silicate glass, supports an absorption layer 2 covered a silver film 3. Disposed on the silver layer 3 is an anti-reflection layer 4. The absorption layer 2 consists of a chromium-nickel alloy having 20% by weight chromium and 80% by weight nickel and is sufficiently thick to ensure that the light transmissivity of the partial laminate consisting of the transparent support layer 1 and the absorption layer 2 is between 10–65% less than the light transmission of the trasnparent support layer by itself, approximately 17% reduction has been found suitable. The thickness of the silver film depends on the desired light transmissivity of the heat-reflecting pane and is usually in the range from 150 to 400 A. The anti-reflection layer 4 consists of ZnS and may be about 450 A thick, so that it acts as a $\lambda/4$ plate for a wavelength ($\lambda$) of about 550 nm and therefore has a particularly satisfactory anti-reflection effect in the visible light range to which the human eye is most sensitive. When the pane is inserted in the window frame, the glass sheet 1 is disposed on the outside of the window. Curve $a$ in FIG. 2 shows the spectral transmissivity of a heat-reflecting window pane embodying the invention (with a silver coating) for the wavelength range of 400–2500 nm. In the wavelength range to which the human eye is most sensitive, i.e., the region of about 550 nm, transmission is at the maximum. Transmission is very considerably reduced in the direction of longer wavelengths, so that the infra-red component of solar radiation can pass through the pane only to a very small extent.

Curve $b$, representing the spectral reflection of the heat-reflecting pane from the glass side, shows that the long wave infra-red component of solar radiation is very strongly reflected. In the visible range the reflection values are much less different for the various wavelengths in comparison with a pane having a gold layer. The result is that, when the pane is viewed from the outside, it is practically neutral in color with a very slight tinge of bluish-grey, and this is very desirable from the architectural point of view, since from the color point of view a pane which looks substantially neutral when viewed from outside can be combined with very various facade elements. In this respect heat-reflecting panes embodying the present invention are superior to the gold-coated panes of German Pat. No. 2,029,181 in which the bluish-grey tint is more marked when the pane is viewed from outside.

The curve $c$ in FIG. 2 shows the spectral characteristics of reflection from the interference layer disposed to the inside of the window. The curve $c$ shows that, more particularly in the wavelength range to which the human eye is very sensitive, reflection in relation to the infra-red wavelength range is substantially lower in comparison with a simple silver layer, so that the reflection effect is substantially eliminated in comparison therewith.

EXAMPLE 1

A float glass pane 5 mm in thickness and 2 × 3 m in size is disposed in a large industrial vapor-treatment plant, with vapor coating apparatus for applying three layers. After the vapor coating vessels are loaded respectively with a chromium nickel alloy, consisting of 80% by weight of nickel and 20% by weight chromium, silver and zinc sulphide, the plant is evacuated to a pressure of about $3 \times 10^{-2}$ Torr. The glass surface is then cleaned for eight minutes by glow discharge and any layers of water adhering are removed. After further evacuation to a pressure of $6 \times 10^{-5}$ Torr, the layers 2-4 are vapor coated on to the float glass pane.

The vapor deposition of the chromium nickel alloy reduces the light transmissivity of the float glass sheet, which was 90% before the start of vapor deposition, to 75%. The ZnS layer vapor coated after the vapor coating of the silver film was about 460 A in thickness.

The resulting heat-reflecting window pane had the following optical properties:

Light transmissivity (referred to the sensitivity of the human eye) = 55%.

Reflection from the coated side (referred to the total solar radiation) = 48%.

Reflection from the glass side (referred to total solar radiation) = 41%.

Transmissivity (referred to total solar radiation) = 34%.

In use, the window pane is installed in a window frame so that the glass sheet is disposed on the outside. When observed from the outside, the window pane has the required uniform and substantially neutral tint and shows no irregularities even when viewed from the inside.

EXAMPLE 2

The absorption film, comprising a chromium nickel alloy of the same composition as in Example 1, is vacuum deposited on the glass sheet in a thickness such that the light transmissivity is reduced to 66%. Next silver and then zinc sulphide are vapor coated as a $\lambda/4$ layer in the manner already described. The resulting heat-reflecting window pane has the following optical properties:

Light transmissivity (referred to sensivity of human eye) = 45%.

Reflection from the layer side (referred to total solar radiation) = 51%.

Reflection from the glass side (referred to total solar radiation) = 43%.

Transmissivity (related to total solar radiation) = 27%.

The pane produced in accordance with Example 2 is also inserted in a window frame in such a manner that the glass pane is on the outside; it shows a pleasant uniform substantially neutral tint and had no cloudiness even when looked through.

Heat-reflecting panes embodying the present invention may constitute the outer sheet of a double-glazed unit, the applied layers of the heat-reflecting pane being disposed between the two panes 1 and 5 and thereby being protected aginst damage.

Although the teachings of my invention have herein been discussed with reference to specific theories and embodiments, it is to be understood that these are by way of illustration only and that others may wish to utilize my invention in different designs or applications.

I claim as my invention:

1. A heat-reflecting window pane having a transmissivity of 20–60% for visible light and a uniform neutral gray color when viewed from either side comprising: a transparent support layer coated with a heat-reflecting silver layer, an absorption layer selected from the group consisting of metals, metalloids and metal alloys disposed between the silver layer and the transparent support layer, said absorption layer having a thickness to provide a light transmissivity of the laminate consisting of the transparent support layer and the absorption layer which is 10–65% less than that of the transparent support layer, the refractive index and the absorption coefficient of the absorption layer being of the same order of magnitude for visible light, and an anti-reflection layer of refractive dielectric material which is substantially absorption-free for visible light and has a refractive index of more than 1.7 disposed on the other side of the silver film from the absorption layer.

2. A heat-reflecting window pane according to claim 1 wherein the absorption layer has a thickness chosen to provide a light transmissivity of the laminate consisting of the transparent support layer and the absorption layer which is 15–60% less than that of the transparent support layer.

3. A heat-reflecting pane according to claim 2 wherein the refractive index and the absorption coefficient of the absorption layer are equal for visible light.

4. A heat-reflecting pane according to claim 1 wherein the absorption layer is chosen from the group consisting of one of the elements of the fourth period of the periodic table of elements having the atomic numbers 20–28 inclusive, alloys of at least two of those elements only and alloys of at least one of those elements with other elements.

5. A heat-reflecting pane according to claim 4 wherein the absorption layer consists of a chromium-nickel alloy containing 20% by weight of chromium and 80% by weight of nickel.

6. A heat-reflecting pane according to claim 5 wherein the anti-reflection layer consists of ZnS.

7. A heat-reflecting pane according to claim 6 wherein the anti-reflection layer is covered by a transparent protective layer.

8. A heat-reflecting window pane having a neutral gray uniform color when viewed from either side together with a high light reflection range from both sides for light of the higher wave lengths comprising a laminate consisting of a transparent support layer, an absorption layer, a reflecting layer, and an anti-reflection layer, the absorption layer selected from the group consisting of metals, metalloids, and metal alloys and being disposed between the reflecting layer and the transparent support layer, the combination of the absorption layer and the transparent support layer having a light transmissivity which is between 15–60% less than that of the transparent support layer alone, the refractive index and the absorption coefficient of the absorption layer being substantially equal for visible light, the reflecting layer being silver, the anti-reflection layer comprising a layer of dielectric material which is substantially absorption-free for visible light having a refractive index of more than 1.7, the anti-reflection layer disposed on the opposite side of the reflecting layer from the absorption layer.

9. The window pane of claim 8 wherein the absorption layer consists of a chromium-nickel alloy containing substantially more nickel than chromium.

10. The window pane of claim 9 wherein the anti-reflection layer consists of zinc sulphide.

11. The window pane of claim 10 wherein a second layer of transparent support layer material is provided on the opposite side of the anti-reflection layer from the first transparent support layer.

12. The window pane of claim 11 wherein the transparent support layers are glass.

13. A heat-reflecting window pane having a neutral color when viewed from either side together with a high light reflection range from both sides for light of the higher wave lengths comprising a base layer of a transparent material, and successive vacuum deposited layers of a chromium-nickel alloy, silver and zinc sulphide, the chromium-nickel alloy layer being sufficiently thick that it provides a light transmissivity of the laminate consisting of the transparent support layer and the chromium-nickel alloy layer which is from 10–65% less than that of the transparent support layer alone, the silver layer having a thickness between 150–400 A, and the zinc sulphide layer having a thickness sufficient for it to act as $\lambda/4$ plate for a wave length ($\lambda$) of approximately 550 nm.

* * * * *